(12) United States Patent
Wetzig et al.

(10) Patent No.: US 7,795,876 B2
(45) Date of Patent: Sep. 14, 2010

(54) COLD CATHODE PRESSURE SENSOR

(75) Inventors: Daniel Wetzig, Cologne (DE); Ludolf Gerdau, Elsdorf (DE)

(73) Assignee: Inficon GmbH, Cologne (DE)

( * ) Notice: Subject to any disclaimer, the term of this patent is extended or adjusted under 35 U.S.C. 154(b) by 420 days.

(21) Appl. No.: 11/885,719

(22) PCT Filed: Mar. 2, 2006

(86) PCT No.: PCT/EP2006/060397

§ 371 (c)(1),
(2), (4) Date: Sep. 5, 2007

(87) PCT Pub. No.: WO2006/094927

PCT Pub. Date: Sep. 14, 2006

(65) Prior Publication Data

US 2008/0142710 A1   Jun. 19, 2008

(30) Foreign Application Priority Data

Mar. 9, 2005 (DE) .................... 10 2005 010 716

(51) Int. Cl.
*G01L 21/30* (2006.01)
*G01N 27/62* (2006.01)
(52) U.S. Cl. ..................... 324/460; 324/464
(58) Field of Classification Search ............... 324/460, 324/459, 462, 403, 405, 463, 464
See application file for complete search history.

(56) References Cited

U.S. PATENT DOCUMENTS

| 1,596,758 | A |   | 8/1926  | Mutscheller |            |
|-----------|---|---|---------|-------------|------------|
| 3,839,655 | A | * | 10/1974 | Helgeland et al. | 313/7 |
| 4,270,091 | A | * | 5/1981  | Mann        | 324/462    |
| 4,398,152 | A | * | 8/1983  | Leveson     | 324/465    |
| 4,967,157 | A | * | 10/1990 | Peacock     | 324/460    |
| 5,126,676 | A | * | 6/1992  | Huston      | 324/464    |
| 5,157,333 | A |   | 10/1992 | Peacock et al. |         |
| 5,422,573 | A | * | 6/1995  | Bills et al. | 324/460   |
| 5,473,162 | A | * | 12/1995 | Busch et al. | 250/341.6 |

(Continued)

FOREIGN PATENT DOCUMENTS

DE    1539154    2/1970

(Continued)

OTHER PUBLICATIONS

1st Page of International Publication WO 2006/094927A3 with published Search Report and Cited References, dated Mar. 20, 2007 (4 pgs.).

(Continued)

*Primary Examiner*—Hoai-An D Nguyen
(74) *Attorney, Agent, or Firm*—Marjama Muldoon Blasiak & Sullivan, LLP

(57) ABSTRACT

A cold cathode pressure sensor has gastight housing, an anode and a cathode arranged in the housing, and a radiation source directed to the cathode for igniting a cold cathode discharge. The housing has a test gas inlet and is at least partly made of glass. The radiation source is arranged outside the housing and irradiates the cathode through the housing glass. The radiation source substantially emits a radiation of a wavelength of more than 400 nm and less than 1,400 nm.

20 Claims, 1 Drawing Sheet

U.S. PATENT DOCUMENTS

| | | | | |
|---|---|---|---|---|
| 5,567,882 | A | * | 10/1996 | Ichimura et al. ............... 73/717 |
| 5,594,243 | A | * | 1/1997 | Weinberger et al. ......... 250/288 |
| 6,023,169 | A | * | 2/2000 | Budovich et al. ............ 324/464 |
| 7,309,992 | B2 | * | 12/2007 | Kudryavtsev et al. ....... 324/464 |

FOREIGN PATENT DOCUMENTS

DE            4207906 A1     9/1992

OTHER PUBLICATIONS

Written Opinion of the International Searching Authority, dated Apr. 2005 (7 pgs.).
PCT Form IB/301 dated Apr. 27, 2006 (2 pgs.).
PCT Form IB/308 (First Notice) dated Oct. 12, 2006 (1 pg.).
PCT Form IB/308 (Second Notice) dated Jul. 12, 2007 (1 pg.).
Redhead P A: "The Magnetron Gauge: A Cold-Cathode Vacuum Gauge", Can J Physics; Canadian Journal of Physics, Nov. 1959, Ottawa, Ontario, Canada, Bd. 37, Nr. 11, Nov. 1959, Seiten 1260-1271, XP008075863, Seite 1266 (12 pgs.).

* cited by examiner

COLD CATHODE PRESSURE SENSOR

CROSS REFERENCE TO RELATED APPLICATIONS

This application is a National Stage filing under 35 U.S.C. §371 of PCT Application No. PCT/EP2006/060397, filed Mar. 2, 2006, published in the German language, which claims priority to German Patent Application No. 10 2005 010 716.8, filed on Mar. 9, 2005 in the German Patent Office. Each of the above applications is incorporated by reference herein.

FIELD OF THE INVENTION

The invention relates to a cold cathode pressure sensor for measuring low pressures and/or partial pressures.

BACKGROUND OF THE PRIOR ART

Cold cathode pressure sensors are Penning, magnetron or inverted magnetron pressure measuring cells, and are primarily used for measuring a gas pressure and/or a partial gas pressure in the high vacuum range. A cold cathode pressure sensor comprises a gastight housing having a test gas inlet through which the test gas enters into the housing. In the housing a cold cathode discharge is induced between an anode and a cathode with a high voltage being applied, wherein an ion current in the burning discharge is nearly proportional to the test gas particle density in the housing. During the cold cathode discharge numerous small electron ring currents flow in the anode region. The ring current electrons collide with gas molecules in the housing. The electron surge causes an ionization of the gas molecules and atoms such that they fly to the cathode and receive another electron there. The voltage pulses thus generated serve as a measure for the particle density, i.e. the test gas pressure in the housing.

When the electron surge is ionized in the housing, and the generated ions impinge on the cathode, secondary electrons are produced which feed the ring current in the housing. With an increasing electron density, the loss rate of the ring currents increases, too, due to the Coulomb repulsion such that a constant ring current is produced in the housing. The buildup of a constant ring current normally takes place within a split second, and is referred to as "ignition".

At a very low gas pressure in the housing, the probability of a surge occurring between an electron and a gas particle may be so small that the generated secondary electrons are not capable of compensating for the electron losses. In this case, a constant ring current is not build up until the number of primary electrons in the housing happens to be sufficient for triggering the ignition.

For this reason a radiation source is provided and/or used for igniting the Penning discharge. From U.S. Pat. No. 5,157,333 a cold cathode pressures sensor is known, wherein in the housing a radiation source is arranged which starts the discharge. The radiation source generates photons which release electrons from the metal cathode due to the photo effect. In metals the photoelectric exit energy for electrons amounts to several electron volts, e.g. for the frequently used cathode metal titanium 4.33 eV. For inducing the photo effect, the ignition radiation must therefore have a wavelength of 287 nm which corresponds to UV light the generation of which is a complex process. The UV radiation source is arranged inside the housing since there are no suitable inexpensive housing materials which are sufficiently permeable to UV light and yet gastight. However, arrangement of the radiation source inside the housing is relatively complicated since electric conduits must pass through the housing wall, and cooling of the radiation source is virtually impossible.

DETAILED DESCRIPTION OF THE INVENTION

Figure 1:
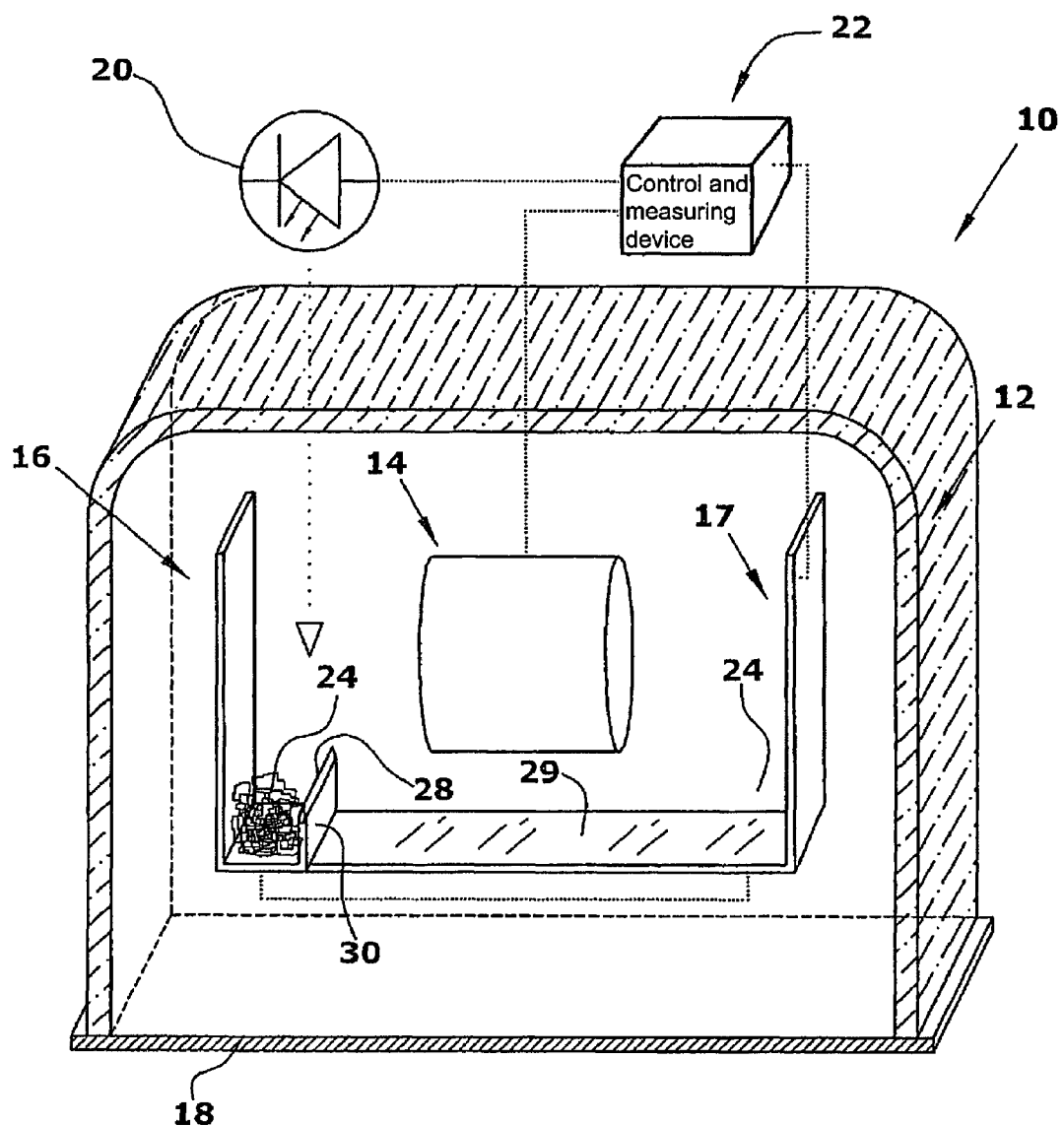
FIG. 1 is a schematic diagram of a cold cathode pressure sensor.

It is an object of the invention to provide a cold cathode pressure sensor comprising a simplified igniting device.

According to the invention, this object is achieved through the features a cold cathode pressure sensor (10) comprising a gastight housing (12) having a test gas inlet (18), an anode (14) and a cathode (16,17) arranged in said housing (12), and a radiation source (20) directed to said cathode for igniting a cold cathode discharge, characterized i n that said housing (12) is at least partly made of glass, said radiation source (20) is arranged outside said housing (12) and irradiates said cathode (16,17) through the housing glass, and said radiation source (20) substantially emits a radiation of a wavelength λ of more than 350 nm and less than 1,400 nm.

The housing of the cold cathode pressure sensor according to the invention is at least partly made of glass, preferably of quartz glass. The radiation source is not arranged inside but outside the housing and irradiates the metal cathode through the housing glass. The radiation source substantially emits a radiation of a wavelength λ of more than 350 nm and less than 1400 nm. Tests have revealed that radiation with a smaller photon energy than that of UV radiation is also suitable for releasing, under certain conditions, photons from the cathode metal due to the photo effect. For this purpose, the field strength E in the respective cathode region must be at least several kV/cm. Due to the strong electrical field, the exit probability of photo effect electrons increases to such an extent that a radiation of lower energy than that of UV radiation and thus a radiation source with a wavelength of more than 350 nm can be used for igniting the discharge. The occurring field strength should not be selected too large since otherwise escaping field effect electrons would falsify the result of the pressure measurement.

When the radiation source is arranged outside the housing, no electric conduits must pass through the housing wall such that problems which may result from the necessity for cooling the radiation source do not arise. The configuration of such a cold cathode pressure sensor is easy and inexpensive to realize.

The housing is at least partly made of glass. Glass housings well suit the purpose due to their vacuum properties, and glass is frequently used as a housing material. Further, glass is to a large extent permeable to radiation with a larger wavelength than that of UV light.

Preferably, the radius of curvature $r_0$ of the cathode edge located closest to the anode, and the voltage $U_{AK}$ between the anode and the cathode are selected such that the field strength E in the region of the cathode edge located closest to the anode is larger than 10 kV/cm and smaller than 1 GV/cm. At a field strength E of more than 10 kV/cm the photon energy required for inducing the photo effect is reduced to such an extent that a non-UV radiation source is normally sufficient for ignition purposes.

According to a preferred embodiment, the radius of curvature $r_0$ of the cathode edge located closest to the anode is smaller than 0.1 mm. Already at radii of curvature $r_0$ of less than 0.1 mm, a voltage $U_{AK}$ of just a few kV between the anode and the cathode allows field strengths to be realized at which radiation sources with a radiation energy of less than 4 eV can be used for inducing the photo effect in the cathode metal.

In particular, the radius of curvature $r_0$ of the cathode edge located closest to the anode may be smaller than 0.05 mm.

Preferably, the wavelength λ of the radiation emitted by the radiation source is larger than 400 nm, preferably larger than 500 nm, and more preferably larger than 600 nm. The radiation power of the radiation source should be at least 1 mW. Flash discharge lamps or incandescent lamps, and in particular light emitting diodes, are suitable radiation sources. Tests performed with red light emitting diodes have revealed that the photon energy generated by said diodes is sufficient for inducing the photo effect. A "white" light emitting diode has a proportion of relatively short-waved "blue" radiation which provides a sufficient photon energy for inducing the photo effect even under unfavorable conditions.

Light emitting diodes are easy and inexpensive to operate and have a long service life.

According to a preferred embodiment, the anode is configured as a ring, and the cathodes are defined by two plates arranged axially to the anode ring. Alternatively, the cathode may be configured as a rod arranged coaxially in the anode ring. In any case, the radiation from the radiation source should be directed to the cathode and/or the cathode edge located closest to the anode.

An embodiment of the invention will now be described in greater detail with reference to the drawing.

The Figure shows a cold cathode pressure sensor according to the invention configured as a Penning measuring cell and comprising a gastight glass housing and a radiation source located outside the housing.

The Figure shows a cold cathode pressure sensor 10 comprising an integral glass housing 12, a cylindrical anode 14 and two essentially plate-shaped metal cathodes 16,17, a test gas inlet 18, a radiation source 20 located outside the hosing 12, and a control and measuring device 22 arranged outside the housing 12.

The housing 12 is made of quartz glass which is to a large extent permeable to radiation in the visible range, and offers a good gas-tightness and a negligible gas emissivity. The housing 12 is substantially configured as a parallelepiped. The test gas inlet 18 is a gas-selective inlet, e.g. configured as a heatable silicon disk which is permeable only to low-molecular gases.

The anode 14 is of cylindrical configuration, and is made of stainless steel. The two cathodes 16, 17 are defined by parallel titanium sheets. The lower ends of the titanium sheets are connected with each other by a plate 29, which results in a rectangular U-shaped overall geometry. One of the titanium sheets 16 has associated therewith a parallel shorter edge sheet 30 arranged in spaced relationship to the titanium sheet 16, said sheet 30 vertically extending from the connecting plate 29. In the thus defined channel the getter material 24 is arranged. The edge sheet 30 comprises a cathode edge 28 located closest to the anode.

The control and measuring device 22 serves for generating an operating voltage $U_{AK}$ between the anode 14 and the cathodes 16 for measuring the electric current between the anode 14 and the cathodes 16, and for controlling the radiation source 20.

Below pressures of $10^{-9}$-$10^{-10}$ mbar the probability of ignition is so small that the ignition must be externally activated.

The work probability D of an electron in metal is calculated as follows:

$$D = \exp\left[-\frac{2U}{\hbar E}\sqrt{2m_e(U-W)}\right]$$

wherein
U: work function of the electron in a metal,
E: field strength effective in front of the metal,
W: energy of the photons impinging on the metal surface,
$m_e$: mass of an electron,
$\hbar$: Planck's quantum of action.

The voltage $U_{AK}$ between the anode 14 and the cathodes 16, 17 is approximately 3 kV. The radius of curvature $r_0$ of the edge 28 located closest to the anode of the cathode sheet 30 is approximately 10 µm. This results in a field strength E at the edge 28 located closest to the anode of 1,000-10,000 kV/cm.

A "white" light emitting diode acts as a radiation source 20, said diode emitting photons of a wavelength λ of 400 to 1,300 nm. The radiation source has a power of approximately 0.1 W which corresponds to approximately $10^{17}$ photons per second. The radiation source 20 must have a minimum power of 1 mW for ensuring successful ignition. Below this power value only a strongly delayed ignition takes place, and above this power value the ignition process is shortened.

The examples described and experimentally substantiated show that for generation of stronger electrical fields an ignition radiation of a wavelength exceeding that of UV radiation can be used. For this reason the ignition radiation source can be arranged outside the housing since the glass, which is the preferred housing material, absorbs UV radiation, while allowing longer-wave radiation to pass nearly unimpeded.

In this manner, a simple and inexpensive ignition assembly arranged outside the housing can be realized.

What is claimed is:

1. A cold cathode pressure sensor comprising:
   a gastight housing having a test gas inlet;
   an anode and a cathode arranged in said housing;
   a radiation source directed to said cathode for igniting a cold cathode discharge;
   a measuring device for measuring an electric current between said anode and said cathode; and
   a control device for generating an electrical voltage $U_{AK}$ between said anode and said cathode and for controlling said radiation source,
   wherein said housing is at least partly made of glass,
   wherein said radiation source is arranged outside said housing, said radiation source irradiates said cathode through said glass, and said radiation source substantially emits a radiation of a wavelength λ of more than 400 nm and less than 1,400 nm, and
   wherein a radius of curvature $r_0$ of an edge located closest to said anode of said cathode, and said electrical voltage $U_{AK}$ between said anode and said cathode are selected such that a field strength E in the region of said edge of said cathode is larger than 10 kV/cm and smaller than 1GV/cm.

2. The cold cathode pressure sensor according to claim 1, wherein said anode is configured as a ring, and said cathode is defined by two plates arranged axially to the ring anode.

3. The cold cathode pressure sensor according to claim 1, wherein said radius of curvature $r_0$ of said edge located closest to said anode of said cathode is smaller than 0.1 mm.

4. The cold cathode pressure sensor according to claim 1, wherein said radius of curvature $r_0$ of said edge located closest to said anode of said cathode is smaller than 0.05 mm.

5. The cold cathode pressure sensor according to claim 1, wherein said radiation source substantially emits a radiation of a wavelength of more than 400 nm, in particular more than 500 nm, and more preferably more than 600 nm.

6. The cold cathode pressure sensor according to claim 1, wherein the radiation power of said radiation source is larger than 1 mW.

7. The cold cathode pressure sensor according to claim 1, wherein said anode is configured as a ring, and said cathode is defined by two plates arranged axially to said anode.

8. The cold cathode pressure sensor according to claim 1, wherein said glass is quartz glass.

9. The cold cathode pressure sensor according to claim 1, wherein said radiation source is a light emitting diode.

10. The cold cathode pressure sensor according to claim 1, wherein said radiation source substantially emits a radiation of a wavelength of more than 400 nm, in particular more than 500 nm, and more preferably more than 600 nm.

11. The cold cathode pressure sensor according to claim 3, wherein said radiation source substantially emits a radiation of a wavelength of more than 400 nm, in particular more than 500 nm, and more preferably more than 600 nm.

12. The cold cathode pressure sensor according to claim 4, wherein said radiation source substantially emits a radiation of a wavelength of more than 400 nm, in particular more than 500 nm, and more preferably more than 600 nm.

13. The cold cathode pressure sensor according to claim 1, wherein the radiation power of said radiation source is larger than 1 mW.

14. The cold cathode pressure sensor according to claim 3, wherein the radiation power of said radiation source is larger than 1 mW.

15. The cold cathode pressure sensor according to claim 4, wherein the radiation power of said radiation source is larger than 1 mW.

16. The cold cathode pressure sensor according to claim 5, wherein the radiation power of said radiation source is larger than 1 mW.

17. The cold cathode pressure sensor according to claim 6, wherein said anode is configured as a ring, and said cathode is defined by two plates arranged axially to the ring anode.

18. The cold cathode pressure sensor according to claim 3, wherein said anode is configured as a ring, and said cathode is defined by two plates arranged axially to the ring anode.

19. The cold cathode pressure sensor according to claim 4, wherein said anode is configured as a ring, and said cathode is defined by two plates arranged axially to the ring anode.

20. The cold cathode pressure sensor according to claim 5, wherein said anode is configured as a ring, and said cathode is defined by two plates arranged axially to the ring anode.

* * * * *